United States Patent
Chow et al.

(10) Patent No.: US 7,713,614 B2
(45) Date of Patent: May 11, 2010

(54) RESIN COMPOSITION AND MULTILAYER STRUCTURE

(75) Inventors: Edgard Chow, Pearland, TX (US); Hiroyuki Shimo, Tokyo (JP); Takaharu Kawahara, Houston, TX (US)

(73) Assignee: Kuraray Co., Ltd., Kurashiki-shi (JP)

( * ) Notice: Subject to any disclaimer, the term of this patent is extended or adjusted under 35 U.S.C. 154(b) by 72 days.

(21) Appl. No.: 11/522,998

(22) Filed: Sep. 19, 2006

(65) Prior Publication Data

US 2008/0070052 A1    Mar. 20, 2008

(51) Int. Cl.
*B32B 27/32* (2006.01)
*B32B 5/16* (2006.01)
*B32B 27/08* (2006.01)
*B32B 27/00* (2006.01)
*B29D 22/00* (2006.01)

(52) U.S. Cl. ............... 428/220; 428/35.7; 428/35.9; 428/36.6; 428/36.7; 428/36.91; 428/330; 428/332; 428/335; 428/337; 428/500; 428/515; 428/516

(58) Field of Classification Search ............... None
See application file for complete search history.

(56) References Cited

U.S. PATENT DOCUMENTS 4,407,897 A    10/1983    Farrell et al.
4,792,484 A    12/1988    Moritani
7,074,949 B2 *  7/2006    Bos ........................... 556/130

OTHER PUBLICATIONS

U.S. Appl. No. 11/440,112, filed May 25, 2006, Edgard Chow, et al.

* cited by examiner

*Primary Examiner*—Sheeba Ahmed
(74) *Attorney, Agent, or Firm*—Oblon, Spivak, McClelland, Maier & Neustadt, L.L.P.

(57) ABSTRACT

To provide a resin composition comprising an ethylene-vinyl alcohol copolymer (A) having an ethylene content of from 15 to 65 mol % and a degree of saponification of 95 mol % or more, a phosphoric acid salt (B) which can form a hydrate, and a dispersing agent (C), wherein the dispersing agent (C) comprises at least one species selected from the group consisting of aliphatic acid salts, glycerol aliphatic acid esters and aliphatic acid amides, the resin composition comprises (A) and (B) in amounts of from 50 to 99 parts by weight and from 1 to 50 parts by weight, respectively, based on 100 parts by weight of (A) and (B) in total, and the resin composition comprises (C) in an amount of from 1 to 20 parts by weight based on 100 parts by weight of (B). This resin composition excels in gas barrier property and also in moisture resistance at high temperatures and high humidities. Therefore, it is suitable for food packaging containers to be retorted.

19 Claims, No Drawings

US 7,713,614 B2

RESIN COMPOSITION AND MULTILAYER STRUCTURE

BACKGROUND OF THE INVENTION

1. Field of the Invention

The present invention relates to a resin composition comprising an ethylene-vinyl alcohol copolymer, which, hereinafter, is also referred to as "EVOH", a phosphoric acid salt, and a dispersing agent. Multilayer structures having a layer of the resin composition are suitably used as packaging containers to be retorted.

2. Description of the Related Art

Materials of containers to be used for retorting foods such as vegetables and seafood are still dominated by glass, metal and metal foil. Recently, however, rigid or semi-rigid plastic containers have come to be commonly used as containers to be used for retorting other types of food such as soups and pet food. Ethylene-vinyl alcohol copolymer (EVOH) has been adopted as a barrier resin for such plastic containers due to its good processability and excellent gas barrier properties.

One known inherent weakness of EVOH, related to its chemical structure, is the fact that its gas barrier properties are greatly diminished at a relative humidity of 85% or higher. That is to say, water acts as a plasticizer to EVOH, weakens the hydrogen bonding in the amorphous region of EVOH, increases the amount of free volume, and ultimately increases the gas diffusivity through the polymer matrix. When such a phenomenon occurs after typical steam retort treatment where packages are processed at temperature of from 110 to 132° C. for periods of from 15 to 80 minutes, EVOH comes to undergo a term now coined in packaging industry as "retort shock". During a retort shock, the oxygen transmission rate of the EVOH dramatically increases and for that period of time the food product suffers from a great damage due to oxidation degradation. Packaging and food engineers have studied and designed, by various approaches, packaging containers for food protection with good storage stability. For example, oxygen permeation through a lid is countermeasured by use of a double seamed metal lid or a thick aluminum/polymer lamination.

In the use of EVOH, the oxygen permeability of the container is maintained appropriately by design techniques intended to keep the EVOH as dry as possible. Firstly, the use of relatively thick polypropylene sidewalls was studied. For some applications, sidewalls with a thickness up to 45 mils (1143 µm) have been adopted. Secondly, the use of a relatively thick layer of EVOH was studied and multilayer structures with as much as 20% by weight of EVOH layer were placed in the market. Thirdly, multilayer structures with an adhesive resin layer containing a desiccant to keep the EVOH dry after the retort treatment were placed in the market. The third approach is disclosed, for example, in U.S. Pat. No. 4,407,897 A.

U.S. Pat. No. 4,792,484 A discloses a composition comprising a matrix of an EVOH having dispersed therein a granular drying agent in a particulate state, wherein among the dispersed granular inorganic drying agent, the volume-area average diameter of granules with a long diameter of at least 10 µm is not greater than 30 µm and the weight ratio of saponification product of the ethylene-vinyl acetate copolymer to the inorganic drying agent ranges from 97:3 to 50:50. As a drying agent used herein, a phosphoric acid salt capable of forming a hydrate is disclosed. Multilayer structures having a layer of the resin composition are also disclosed. The multilayer structures are disclosed to be suitable as containers for retort treatment.

It, however, was not easy to disperse desiccant particles uniformly in the matrix of EVOH and therefore agglomerates were readily generated during melt kneading. Generation of such agglomerates will decrease gas barrier properties or will deteriorate appearance of resulting molded articles and also will increase the frequency of screen exchange of extruders.

SUMMARY OF THE INVENTION

The present invention was made in order to solve the problems mentioned above. An object of the present invention is to provide an EVOH resin composition which excels in gas barrier property, moisture resistance at high temperatures and high humidities, and dispersibility of desiccant particles. Another object is to provide a multilayer structure having a layer of such a resin composition, the multilayer structure being prevented from deterioration in gas barrier properties even during retort treatment. Furthermore, another object is to provide a preferable method for producing such a resin composition.

The above-mentioned objects can be solved by providing a resin composition comprising an ethylene-vinyl alcohol copolymer (A) having an ethylene content of from 15 to 65 mol % and a degree of saponification of 95 mol % or more, a phosphoric acid salt (B) which can form a hydrate, and a dispersing agent (C), wherein the dispersing agent (C) comprises at least one species selected from the group consisting of aliphatic acid salts, glycerol aliphatic acid esters and aliphatic acid amides, the resin composition comprises (A) and (B) in amounts of from 50 to 99 parts by weight and from 1 to 50 parts by weight, respectively, based on 100 parts by weight of (A) and (B) in total, and the resin composition comprises (C) in an amount of from 1 to 20 parts by weight based on 100 parts by weight of (B).

In this constitution, it is desirable that the phosphoric acid salt (B) comprises a powder containing 97% by volume or more of particles having a particle diameter of 16 µm or less. It is also desirable that the phosphoric acid salt (B) comprises a powder having an average particle diameter of 10 µm or less. It is also desirable that the dispersing agent (C) comprises a compound having from 8 to 40 carbon atoms. It is also desirable that the dispersing agent (C) comprises an aliphatic acid salt. In addition, the dispersing agent (C) preferably comprises a glycerol monoaliphatic acid ester, particularly preferably a glycerol monostearate. Moreover, it is desirable that the resin composition comprises the dispersing agent (C) in an amount of from 3 to 10 parts by weight based on 100 parts by weight of the phosphoric acid salt (B).

One desirable embodiment of the present invention is a multilayer structure comprising a layer of the resin composition, and layers of at least one thermoplastic resin selected from the group consisting of polyolefin, polystyrene, polyester, polyamide, polyvinyl chloride, polyvinylidene chloride, polyvinyl acetate and polyacrylonitrile, arranged on both sides of the layer of the resin composition. In addition, the multilayer structure wherein the layers of a thermoplastic resin selected from the group consisting of polyolefins, polystyrenes, polyesters, polyamides, polyvinyl chlorides, polyvinylidene chlorides, polyvinyl acetates and polyacrylonitriles are arranged on both sides of the layer of the resin composition via an adhesive resin layer is also a desirable embodiment of the present invention. A desirable embodiment of the multilayer structure is a packaging container. Another desirable embodiment is a retort package comprising the packaging container filled with contents.

The objects previously mentioned are solved also by providing a method for producing the resin composition comprising melt-kneading an ethylene-vinyl alcohol copolymer (A), a phosphoric acid salt (B) and a dispersing agent (C).

In this constitution, it is desirable that the phosphoric acid salt (B) comprises a powder containing 97% by volume or more of particles having a particle diameter of 16 µm or less. It is also desirable that the phosphoric acid salt (B) and the dispersing agent (C) are mixed before being melt kneaded with the ethylene-vinyl alcohol copolymer (A). It is desirable that the phosphoric acid salt (B) is ground before the melt-kneading. A method wherein the phosphoric acid salt (B) is ground in the presence of the dispersing agent (C) or a method wherein the phosphoric acid salt (B) is ground before the dispersing agent (C) is mixed is preferably employed. It is desirable that the phosphoric acid salt (B) is dried before the melt-kneading. A method wherein the phosphoric acid salt (B) is ground and simultaneously dried or a method wherein the phosphoric acid salt (B) is dried so that the phosphoric acid salt (B) comes to have a water content of 2% by weight or less is preferably employed. In addition, it is desirable that the temperature during the melt-kneading is from 190 to 260° C.

DESCRIPTION OF THE PREFERRED EMBODIMENTS

The resin composition of the present invention is a resin composition comprising an ethylene-vinyl alcohol copolymer (EVOH) (A) having an ethylene content of from 15 to 65 mol % and a saponification degree of at least 95 mol %, a phosphoric acid salt (B) which can form a hydrate, and a dispersing agent (C).

As mentioned above, by incorporating a phosphoric acid salt (B) to an EVOH (A), the gas barrier property at high temperatures and high humidities can be improved. However, agglomerates were readily generated during melt kneading. It has been found that the generation of agglomerates is inhibited effectively by further incorporating thereinto of a dispersing agent (C) even when a phosphoric acid salt (B) is incorporated.

The ethylene content in the EVOH (A) used in the present invention is from 15 to 65 mol %. When the ethylene content is less than 15 mol %, the resin composition will have an insufficient moisture resistance and it is impossible to use such a resin composition particularly under conditions of high temperatures and high humidities such as retort treatment. The ethylene content is preferably 20 mol % or more, and more preferably 25 mol % or more. When the ethylene content is over 65 mol %, the resin composition will have insufficient gas barrier properties and, therefore, can not be used for applications where high gas barrier properties are required. The ethylene content is preferably not more than 50 mol %, and more preferably not more than 40 mol %.

The saponification degree of the EVOH (A) is at least 95 mol %. A low saponification degree results in a low crystallinity of EVOH, which leads to low gas barrier properties and greatly diminished thermal stability at the time of melt-molding. The saponification degree is preferably not less than 98 mol %, and more preferably not less than 99 mol %.

The melt flow rate (at 210° C. under a load of 2160 g) of the EVOH (A) is preferably from 0.1 to 50 g/10 min. When the melt flow rate is less than 0.1 g/10 min, it may become difficult to conduct melt-molding and also become difficult to mix the phosphoric acid salt (B) uniformly. The melt flow rate is preferably not less than 0.5 g/10 min, and more preferably not less than 1 g/10 min. On the other hand, when the melt flow rate is over 50 g/10 min, it will become difficult to conduct extrusion and the strength of the EVOH (A) layer will be diminished. The melt flow rate is more preferably not more than 20 g/10 min, and even more preferably not more than 10 g/10 min.

The phosphoric acid salt (B) which can form a hydrate is a substance which absorbs moisture by forming a hydrate, in other words, a substance which serves as a desiccant. Therefore, a substance capable of forming a hydrate by absorbing moisture as water of crystallization is preferably used. Many phosphoric acid salts form hydrates containing a plurality of water molecules as water of crystallization and, therefore, they can absorb a large amount of water per unit weight. For this reason, they are suitably used for the resin composition of the present invention. Moreover, the number of molecules of water of crystallization which the phosphoric acid salt can contain often increases in steps as the humidity increases. Therefore, the phosphoric acid salt can absorb water gradually with change of humidity environment.

Examples of the phosphoric acid salt (B) to be used in the present invention include sodium phosphate ($Na_3PO_4$), disodium hydrogenphosphate ($Na_2HPO_4$), sodium dihydrogenphosphate ($NaH_2PO_4$), sodium polyphosphate, lithium phosphate, dilithium hydrogenphosphate, lithium dihydrogenphosphate, lithium polyphosphate, potassium phosphate, dipotassium hydrogenphosphate, potassium dihydrogenphosphate, potassium polyphosphate, calcium phosphate ($Ca_3(PO_4)_2$), calcium hydrogenphosphate ($CaHPO_4$), calcium dihydrogenphosphate ($Ca(H_2PO_4)_2$), calcium polyphosphate, ammonium phosphate, diammonium hydrogenphosphate, ammonium dihydrogenphosphate, and ammonium polyphosphate. The polyphosphates include diphosphates (pyrophosphates), triphosphates (tripolyphosphates), etc. Among such phosphates (B), anhydrous salts with no water of crystallization are preferred. Sodium phosphate, disodium hydrogenphosphate, and sodium dihydrogenphosphate are preferred.

The phosphoric acid salt (B) used in the present invention is typically in a powder form. Powders of commercially available phosphoric acid salts (B) have an average particle diameter of from 15 to 25 µm and the size of the largest particle included is from 40 to 100 µm. Use of a powder including such large particles may result in unsatisfactory gas barrier properties of a layer of the resin composition of the present invention. The investigations by the present inventors have revealed that inclusion of particles larger than the thickness of an EVOH resin composition layer tends to greatly diminish gas barrier properties. Multilayer containers including EVOH have applications in which the containers have EVOH layers as thin as about 20 µm.

Therefore, a powder of the phosphoric acid salt (B) used in the present invention preferably includes 97% by volume or more of particles having a particle diameter of 16 µm or less, more preferably includes 97% by volume or more of particles having a particle diameter of 13 µm or less, and even more preferably includes 97% by volume or more of particles having a particle diameter of 10 µm or less. A powder of the phosphoric acid salt (B) preferably has an average particle diameter of 10 µm or less. The average particle diameter is more preferably 8 µm or less, even more preferably 6 µm or less. It is possible to measure such a particle size distribution using a particle size distribution analyzer such as a Coulter counter.

The dispersing agent (C) used in the present invention is the dispersing agent (C) which comprises at least one species selected from the group consisting of aliphatic acid salts, glycerol aliphatic acid esters and aliphatic acid amides. Use of such a dispersing agent (C) results in good dispersibility. Generally, glycerol esters of aromatic carboxylic acids are liquid at room temperature and, therefore, they are not suited for being dry blended with a phosphoric acid salt (B).

Examples of aliphatic acid salts to be used as the dispersing agent (C) include calcium stearate, zinc stearate and magnesium stearate. Examples of such glycerol aliphatic acid esters include glycerol monostearate, glycerol distearate, glycerol tristearate, and mono decanoyl octanoyl glyceride. Aliphatic acid amides are exemplified by ethylene bisstearic amide and the like.

Among such dispersing agents (C), aliphatic acid salts are suitably used from the viewpoints of improvement in the slipping property of a powder of phosphoric acid salt (B) and prevention of screen clogging of extruders during melt kneading. Especially, calcium salts and zinc salts are preferred, and calcium stearate and zinc stearate are particularly preferred. From the viewpoint of achieving particularly good dispersibility, glycerol aliphatic acid esters are suitably used. In particular, glycerol mono- or dialiphatic acid esters are preferred. Glycerol monoaliphatic acid esters are more preferred. Glycerol monostearate is particularly preferred.

Moreover, the dispersing agent (C) preferably comprises a compound having from 8 to 40 carbon atoms. When the number of carbon atoms is within such a range, a good dispersibility can be achieved. A more preferable lower limit of the number of carbon atoms is 12 and a more preferable upper limit of the number of carbon atoms is 30.

The compounding ratio of the EVOH (A) and phosphoric acid salt (B) in the resin composition of the present invention is from 50 to 99 parts by weight of (A) and from 1 to 50 parts by weight of (B), respectively, based on 100 parts by weight of the total amounts of (A) and (B). In the resin composition of the present invention, the EVOH (A) forms a matrix as a main component and thereby gas barrier properties are secured. When the content of the phosphoric acid salt (B) is less than 1 part by weight based on 100 parts by weight of the total amounts of (A) and (B), the moisture resistance, especially the moisture resistance at high temperatures and high humidities, of the resin composition is diminished. The content of the phosphoric acid salt (B) is preferably not less than 5 parts by weight, more preferably not less than 10 parts by weight, and even more preferably not less than 15 parts by weight. When the content of the phosphoric acid salt (B) is over 50 parts by weight based on 100 parts by weight of the total amounts of (A) and (B), gas barrier properties of the resin composition are diminished. The content of the phosphoric acid salt (B) is preferably not more than 40 parts by weight, and more preferably not more than 30 parts by weight.

The amount of the dispersing agent (C) compounded is from 1 to 20 parts by weight based on 100 parts by weight of the phosphoric acid salt (B). When the content of the dispersing agent (C) is less than 1 part by weight based on 100 parts by weight of the phosphoric acid salt (B), it is impossible to inhibit generation of agglomerates of the phosphoric acid salt (B). The content of the dispersing agent (C) is preferably not less than 2 parts by weight, and more preferably not less than 3 parts by weight. On the other hand, when the content of the dispersing agent (C) exceeds 20 parts by weight based on 100 parts by weight of the phosphoric acid salt (B), it becomes difficult to feed resin composition pellets into an extruder due to their too great slipping property and the interlayer adhesion is lowered when a multilayer structure is produced. The content of the dispersing agent (C) is preferably not more than 15 parts by weight, and more preferably not more than 10 parts by weight.

The following is a description regarding the method for producing the resin composition of the present invention. The method for producing the resin composition of the present invention is not particularly limited, but the resin composition is generally produced by melt-kneading an EVOH (A), a phosphoric acid salt (B) and a dispersing agent (C).

The phosphoric acid salt (B) of the present invention preferably contains no coarse particle. As mentioned above, a powder having a specific particle size distribution or a specific average particle diameter is preferably used. Although the method for producing such a powder is not particularly limited, it is desirable to grind a commercially available powder of a phosphoric acid salt (B). In other words, it is preferable that the phosphoric acid salt (B) is ground before the melt-kneading. As a device for the grinding, a jet mill, a ball mill, a cutting mill, an impact pulverizer, and the like may be used. In particular, a jet mill, especially a fluidized bed jet mill is suitably used. It is desirable that particles are ground through their collision caused by collision of opposing jet air flows in a fluidized bed jet mill. This makes it possible to prevent contamination of metal. Further, the grinding device preferably has a classifier built therein. The built-in classifier preferably is a multi-wheel classifier, which can yield a powder with a sharp particle size distribution efficiently.

The water content of the phosphoric acid salt (B) to be melt kneaded with the EVOH (A) is an important factor for controlling the number of agglomerates occurring in the resulting resin composition. Therefore, the water content of the phosphoric acid salt (B) is preferably 2% by weight or less. If the phosphoric acid salt (B) has a high water content, agglomerates will occur easily in a resulting resin composition when the phosphoric acid salt (B) is melt-kneaded with the EVOH (A). The water content is more preferably not more than 1% by weight, and even more preferably not more than 0.5% by weight. For this reason, it is desirable that the phosphoric acid salt (B) is dried before its melt-kneading with the EVOH (A). The drying temperature is preferably from 60 to 120° C. It is noted that in the case where the phosphoric acid salt (B) and the dispersing agent (C) have been mixed before they are melt kneaded with the EVOH (A), a water content based on the combined weight of the phosphoric acid salt (B) and the dispersing agent (C) is used as the water content of the phosphoric acid salt (B).

It is also preferable that the phosphoric acid salt (B) is ground and simultaneously dried. It is possible to grind and simultaneously dry the phosphoric acid salt (B) by grinding it while introducing dry gas into a grinding machine. In use of a jet mill, for example, it is preferable to conduct grinding by use of heated compressed gas because grinding and simultaneously drying can easily be achieved simultaneously. It is also preferable to dry only the phosphoric acid salt (B) first and then dry it further while grinding it simultaneously.

The timing of addition of the dispersing agent (C) is not particularly restricted. It is permissible to grind the phosphoric acid salt (B) in the presence of the dispersing agent (C). It is also permissible to add the dispersing agent (C) after grinding of the phosphoric acid salt (B). Grinding the phosphoric acid salt (B) in the presence of the dispersing agent (C) has the advantage of being able to omit some steps and makes it easy to mix them uniformly. On the other hand, when grinding the phosphoric acid salt (B) first and then mixing the dispersing agent (C), it is possible to grind the phosphoric acid salt (B) in the air at temperatures near the boiling point of water or more without causing blocking in the grinding machine. Therefore, it is possible to dry the phosphoric acid salt (B) efficiently during the grinding operation. The timing of the addition may be appropriately chosen taking into consideration the kind of the dispersing agent (C), grinding conditions and drying conditions.

It is desirable that the phosphoric acid salt (B) and the dispersing agent (C) are mixed before being melt kneaded with the EVOH (A) by doing as mentioned above. By this procedure, particles of the phosphoric acid salt (B) can be uniformly dispersed in a matrix of the EVOH (A).

For the melt-kneading, devices commonly used for melt-kneading of resin may be used. As a kneading device, a continuous kneading device such as a single screw extruder and a twin screw extruder may be used. Alternatively, a batch type kneading device such as a Banbury mixer may also be used. It is also permissible to mix the phosphoric acid salt (B) and the dispersing agent (C), by use of a Henschel mixer or a tumbler, to pellets or a powder of an EVOH (A) before the feeding into such a kneading device.

The temperature during the melt-kneading is not particularly limited so long as EVOH (A) can be molten at that temperature, but it is preferably from 190 to 260° C. When the melt-kneading temperature is lower than 190° C., the EVOH (A) may be molten insufficiently. The melt-kneading temperature is more preferably 210° C. or higher. On the other hand, when the melt-kneading temperature is over 260° C., the EVOH (A) or phosphoric acid salt (B) may decompose. The melt-kneading temperature is more preferably 245° C. or lower.

The thus-obtained resin composition of the present invention has a characteristic that gas barrier properties are not diminished very much even after a treatment under high temperature, high humidity conditions like retort treatment. It is expected that not only when a normal retort treatment is conducted by heating to a temperature of 100° C. or higher and applying pressure in an autoclave but also when a steam retorting, water cascade retorting, microwave retorting, hot filling, pasteurization, boiling, etc. are conducted, similar phenomena will occur and similar effects are obtained.

The resin composition of the present invention preferably has a water content of not more than 1% by weight prior to melt-molding. By making the water content low, it is possible to inhibit the foaming during a melt molding process. The water content is more preferably not more than 0.5% by weight, and even more preferably not more than 0.25% by weight. In order to form a resin composition with such water content, a resin composition before melt-molding may be heated to dry or a resin composition may be prepared by using materials fully dried in advance.

The resin composition of the present invention may include other components unless the effects of the present invention are impaired. For example, it may include thermoplastic resin other than EVOH (A). Examples of such thermoplastic resin include polyolefins such as polyethylene (very low density, low density, middle density, high density), ethylene-vinyl acetate copolymers, ethylene-acrylic ester copolymers, polypropylene, ethylene-propylene copolymers and ionomers; products resulting from graft modification of such polyolefins with maleic anhydride, glycidyl methacrylate, etc.; semi-aromatic polyesters such as polyethylene terephthalate and polybutylene terephthalate; aliphatic polyesters such as polyvalerolactone, polycaprolactone, polyethylene succinate and polybutylene succinate; aliphatic polyamides such as polycaprolactam, polylaurolactam, polyhexamethylene adipamide, and polyhexamethylene azelamide; polyethers such as polyethylene glycol and polyphenylene ether.

Further, it may include various types of plasticizers, stabilizers, surfactants, colorants, UV absorbers, antistatic agents, crosslinking agents, metal salts, fillers and reinforcements such as fibers.

The resin composition of the present invention is molded by melt molding into various molded articles such as films, sheets, containers, pipes and fibers. Available methods of melt molding include, for example, extrusion molding, inflation extrusion molding, blow molding, melt spinning, and injection molding. The melt molding temperature varies depending on the melting point of the EVOH (A), etc., but preferably is about 150 to 270° C.

The resin composition of the present invention may be used as a molded article consisting of a single layer of the resin composition only. The resin composition, however, is preferably fabricated into a multilayer structure including at least one layer thereof. When the resin composition of the present invention, an adhesive resin and a thermoplastic resin are abbreviated to EVOH, Tie and P, respectively, the layer constitution of the multilayer structure may be, but is not limited to, EVOH/P, P/EVOH/P, EVOH/Tie/P, and P/Tie/EVOH/Tie/P. Each of the layers shown above may be composed of either a single layer or, under certain circumstances, multiple layers.

In particular, in order to make use of one of the characteristics of the resin composition of the present invention as being excellent in moisture resistance, multilayer structures comprising a layer of the resin composition, and layers of at least one thermoplastic resin selected from the group consisting of polyolefin, polystyrene, polyester, polyamide, polyvinyl chloride, polyvinylidene chloride, polyvinyl acetate and polyacrylonitrile, arranged on both sides of the layer of the resin composition are preferred embodiments. Considering moisture resistance, polyolefin, polystyrene and polyester are preferably used and polyolefin is particularly preferably used.

Examples of the polyolefin include low density polyethylene, middle density polyethylene, high density polyethylene, linear low density polyethylene, ethylene-vinyl acetate copolymers, ethylene-propylene copolymers, polypropylene, polybutene, polymethylpentene and ionomers.

Multilayer structures are also preferred in which layers of at least one thermoplastic resin selected from the group consisting of polyolefin, polystyrene, polyester, polyamide, polyvinyl chloride, polyvinylidene chloride, polyvinyl acetate and polyacrylonitrile are arranged on both sides of the layer of the resin composition via an adhesive resin layer.

Although the adhesive resin is not particularly restricted so long as it can adhere the resin composition layer to the thermoplastic resin layers, an adhesive resin comprising carboxylic acid-modified polyolefin is preferred. The carboxylic acid-modified polyolefin referred to herein means a modified olefin-based polymer with a carboxyl group produced by linking an ethylenically unsaturated carboxylic acid or its anhydride to an olefin-based polymer chemically (for example, by addition reaction or graft reaction). The olefin-based polymer as used herein refers to polyolefin such as polyethylene (low pressure, middle pressure, high pressure), linear low density polyethylene, polypropylene and polybutene; and copolymers of an olefin and a comonomer copolymerizable with the olefin (e.g., vinyl ester and unsaturated carboxylic acid ester) such as ethylene-vinyl acetate copolymers and ethylene-ethyl acrylate copolymers. The ethylenically unsaturated carboxylic acid or its anhydride includes ethylenically unsaturated monocarboxylic acid, an ester thereof, ethylenically unsaturated dicarboxylic acid, and mono- or diester or anhydride thereof. Among them, ethylenically unsaturated dicarboxylic acid anhydride is preferred. Specific examples are maleic acid, fumaric acid, itaconic acid, maleic anhydride, itaconic anhydride, maleic acid monomethyl ester, maleic acid monoethyl ester, maleic acid diethyl ester and fumaric acid monomethyl ester. In particular, maleic anhydride is preferred.

The amount of the ethylenically unsaturated carboxylic acid or its anhydride added or grafted to the olefin-based polymer (modification degree) is 0.01 to 15% by weight and preferably 0.02 to 10% by weight based on the weight of the olefin-based polymer.

The thus-obtained coextruded multilayer structure or coinjected multilayer structure are subjected to secondary processing to obtain various types of molded articles, such as film, sheet, tube and bottle. Examples of such molded articles include:

(1) multilayer co-oriented sheets or films resulting from uniaxially or biaxially drawing of multilayer structures (e.g., sheet or film) followed, if necessary, by heat treatment;

(2) multilayer rolled sheets or films resulting from rolling of multilayer structures (e.g., sheets or films);

(3) multilayer tray cup-shaped containers resulting from thermoforming, e.g., vacuum forming, pressure forming and vacuum-pressure forming, of multilayer structures (e.g., sheets or films);

(4) bottle-shaped or cup-shaped containers resulting from stretch blow molding of multilayer structures (e.g., pipes); and (5) bottle-shaped containers resulting from biaxially stretch blow molding of multilayer structures (e.g., parisons).

The thus-obtained multilayer structure may be used for various applications without any limitations and it is suitably used as a material of wrapping film, deep drawn container, cup-shaped container, bottle, etc. In particular, it is suited for containers for packaging contents whose oxidation degradation should be avoided, especially foods. The multilayer structure of the present invention is particularly suited for containers for retort treatment because it exhibits good gas barrier properties even under high temperature and high humidity conditions. As the retort treatment, steam retorting, water cascade retorting, microwave retorting, etc. may be adopted as well as normal retorting by applying pressure under heating at a temperature of 100° C. or higher. The multilayer structure can be used not only for retorting. It is suited for containers for hot filling, pasteurization and boiling.

A recycled composition obtained by melt-kneading the multilayer structure is also a preferable embodiment of the present invention. In processes for producing thermoformed containers or the like, it is a usual practice to recover punch wastes or defective molded products generated during a process, pulverize them and reuse the resulting material for container production. Therefore, a multilayer structure having a layer of a recycled composition resulting from recycling and melt-kneading is a preferable embodiment from the economic point of view. In the resin composition of the present invention, agglomerates of the phosphoric acid salt (B) were not readily generated. Therefore, even a recycled composition which is to be melt-kneaded repeatedly is prevented from generation of agglomerates effectively. A recycled composition layer is used for forming constitutions resulting from replacing the thermoplastic resin (P) layer(s) by a recycled composition (Reg) layer(s) or constitutions resulting from replacing the thermoplastic resin (P) layer(s) by a lamination(s) (P/Reg) composed of a thermoplastic resin (P) layer and a recycled composition (Reg) layer in the examples of the layer constitution of the multilayer structure described previously.

EXAMPLES

The present invention is described below more concretely with reference to examples.

Example 1

Effect of Addition of Various Dispersing Agents

Disodium hydrogenphosphate (B) used in this Example is "683522" manufactured by ICL Performance Product Inc. This is a powder having an average particle diameter of 3.4 μm and also having a D97 of 10.4 μm, where the D97 is a particle diameter such that particles with diameters not greater than the D97 account for 97% by weight of all particles. Here, the data of the average particle diameter and particle size distribution are measured with a "Beckman-Coulter LS I3 320" manufactured by Beckman-Coulter's Particle Size Characterization Laboratory, and likewise in the following Examples.

The disodium hydrogenphosphate (B) was dried by heating it in a convection oven at 90° C. for 2 hours. Then, it was blended with a dispersing agent (C) over 2 minutes by use of a compact hammer style grinder "SK-M10" manufactured by Kyoritsu-Riko Co., Ltd. The kinds and amounts of the dispersing agents (C) used are shown in Table 1.

The thus-obtained mixture of the disodium hydrogenphosphate (B) and the dispersing agent (C) and an EVOH (A) "EVAL L171" (ethylene content: 27.2 mol %, degree of saponification: 99.6 mol %, MFR: 3.8 g/10 min. (210° C., 2160 g-load) were melt-kneaded so that the content of disodium hydrogenphosphate (B) in the resulting resin composition became 20% by weight. The melt-kneading was performed at a screw rotation speed of 80 rpm at a temperature of 220° C. with a twin screw extruder "DSM15 microcompounder." A 2-mm-diameter strand extruded was cut into a length of from 2.5 to 3 mm, so that resin composition pellets were obtained. A 50 g portion of the resin composition pellets was subjected to hot press molding to produce a film with a thickness of about 8 mil (about 0.2 mm). A 50 mm by 90 mm area of the film was visually observed and a number of agglomerates as large as about 50 μm or more was counted.

The dispersing agent (C) used for the tests were glycerol monostearate (GMS: 21 carbon atoms), glycerol distearate (GDS: 39 carbon atoms), glycerol tristearate (GTS: 57 carbon atoms), zinc stearate (ZnSt: 18 carbon atoms) and ethylene bisstearic amide (EBSA: 38 carbon atoms). Each dispersing agent (C) was added so that it was contained in an amount of 0, 2, 5 or 10 parts by weight per 100 parts by weight of disodium hydrogenphosphate (B). The results are shown together in Table 1.

TABLE 1

| Dispersing agent (C) | | |
|---|---|---|
| Kind | Compounded amount (parts by weight) | The number of agglomerates |
| None | 0 | 35 |
| GMS | 2 | 39 |
| GMS | 5 | 5 |
| GMS | 10 | 2 |
| GDS | 2 | 28 |
| GDS | 5 | 13 |
| GDS | 10 | 9 |
| GTS | 2 | 51 |
| GTS | 5 | 15 |
| GTS | 10 | 18 |
| ZnSt | 2 | 27 |
| ZnSt | 5 | 12 |
| ZnSt | 10 | 5 |

TABLE 1-continued

| | Dispersing agent (C) | |
|---|---|---|
| Kind | Compounded amount (parts by weight) | The number of agglomerates |
| EBSA | 2 | 24 |
| EBSA | 5 | 15 |
| EBSA | 10 | 7 |

As it is clear from Table 1, addition of dispersing agents (C) can inhibit generation of agglomerates. One particularly preferable from the viewpoint of prevention of agglomerate generation is glycerol monostearate (GMS). On the other hand, when zinc stearate (ZnSt) was used, the dry flow behavior of powders was improved more in comparison to glycerol monostearate (GMS), resulting in superior operationality in melt-kneading with the EVOH (A).

Example 2

Test of Extruder Screen Clogging

Disodium hydrogenphosphate (B) being the same as that used in Example 1 was blended with a dispersing agent (C) after being heated by the operations being the same as those in Example 1. The resulting mixture of the disodium hydrogenphosphate (B) and the dispersing agent (C) and an EVOH (A) being the same as that used in Example 1 were melt-kneaded together so that the content of the disodium hydrogenphosphate (B) in the resin composition became 20% by weight. The melt kneading was conducted using a twin screw extruder with a screw diameter of 47 mm and an L/D of 42 at 230° C. To the front end of the extruder is attached a screen pack composed of a 20-mesh screen, a 60-mesh screen and a 40-mesh screen layered in this order.

Screen exchange times are shown together in Table 2, the times being taken in the course of melt kneading at the extrusion rates (pound/hour) shown in Table 2 using the dispersing agents (C) of the kinds and compounded amounts (based on 100 parts by weight of disodium hydrogenphosphate (B)) shown in Table 2. Here, although the back pressure exerted on the extruder during melt kneading at 230° C. is normally from about 200 to about 300 psi, screens clog with lapse of the melt kneading time and the temperature rises with the increase in the back pressure. Here, the time taken until the arrival of the back pressure at 500 psi or until the arrival of the temperature to 255° C. was defined as a screen exchange time.

TABLE 2

| | Dispersing agent (C) | | |
|---|---|---|---|
| Kind | Compounded amount (parts by weight) | Extrusion rate (lb/hr) | Screen exchange time (hours) |
| None | 0 | 150 | 2 |
| GMS | 4 | 165 | 3.5 |
| GMS | 6 | 165 | 5 |
| GMS | 8 | 170 | 6.25 |
| ZnSt | 6 | 215 | 8 |

As it is clear from Table 2, addition of dispersing agents (C) made screens resistant to clogging and made the time taken until screen exchange longer, thereby reducing the frequency of screen exchange. Particularly, use of zinc stearate (ZnSt) successfully reduced the frequency more than use of glycerol monostearate (GMS) did.

Example 3

Amount of Dispersing Agent (C) Compounded

The sodium dihydrogenphosphate (B) used in this Example is "N11-30" manufactured by Budenheim, which is a powder having an average particle diameter of 5.3 μm and a D97 of 15.7 μm. The sodium dihydrogenphosphate (B) was blended with a dispersing agent (C) after being heated by operations being the same as those used in Example 1. Mixtures were obtained by varying the content of the dispersing agent (C) (glycerol monostearate) as shown in Table 3. The resulting mixture of the sodium dihydrogenphosphate (B) and the dispersing agent (C) and an EVOH (A) being the same as that used in Example 1 were melt-kneaded together so that the content of the disodium hydrogenphosphate (B) in the resin composition became 20% by weight. The melt kneading was conducted using a twin screw extruder with a screw diameter of 30 mm and an L/D of 45.5.

3-Kind 5-layer films having an overall thickness of 6 mil (152 μm) were obtained by using the resulting EVOH resin composition pellets, LLDPE pellets ("Dowlex 2025" manufactured by Dow Chemical Co., Ltd.) and adhesive resin (Tie) pellets ("Bynel CXA4125" manufactured by DuPont). The layer constitution was LLDPE/Tie/EVOH/Tie/LLDPE=66/4/12/4/66 (μm). During the film production, whether slip occurred or not during the introduction of the EVOH resin composition pellets into the extruder was evaluated. The interlayer adhesiveness of the multilayer film obtained was determined as a T-peel strength (g/25 mm) using a tensile tester "Instron." The results are shown together in Table 3.

TABLE 3

| | Dispersing agent (C) | | |
|---|---|---|---|
| Kind | Compounded amount (parts by weight) | Occurrence of slip | Adhesion (g/25 mm) |
| None | — | No slip | 2461 |
| GMS | 2 | No slip | 2347 |
| GMS | 4 | No slip | 2374 |
| GMS | 6 | No slip | 2401 |
| GMS | 8 | No slip | 2314 |
| GMS | 10 | Slightly occurred | 2207 |
| GMS | 12 | Considerably occurred | 1803 |
| GMS | 15 | Notably occurred | 1234 |
| GMS | 20 | Excessively occurred | 1337 |

As it is clear from Table 3, increase in the amount of a dispersing agent (C) added to a phosphoric acid salt (B) increase the occurrence of slip during the introduction of resulting EVOH resin composition pellets into an extruder, making it difficult to feed pellets smoothly. Table 3 is also shown that increase in the amount of a dispersing agent (C)

reduces the interlayer adhesion. Therefore, it became clear that it is undesirable to add too much dispersing agent (C) to a phosphoric acid salt (B).

Example 4

Effects of Conditions

Powders of three kinds of disodium hydrogenphosphate (B) differing in water content (4.94% by weight, 3.24% by weight, 1.22% by weight) were used as raw materials. These powders have an average particle diameter of 15.5 µm and a D97 of 52.1 µm. These disodium hydrogenphosphates (B) and the dispersing agents (C) of the kinds and compounded amounts (based on 100 parts by weight of disodium hydrogenphosphate (B)) shown in Table 4 were mixed for 20 minutes by use of a tumbler.

The thus-obtained mixtures were ground using a fluidized bed jet mill "Hosokawa AFG-400" manufactured by Alpine and Hosokawa Micron Powder Systems. The jet mill is a machine in which particles are ground through their collision caused by collision of opposing jet air flows. The jet mill has a multi-wheel classifier therein. By varying the rotation speed of the multi-wheel classifier, it is possible to obtain particles with a desired particle size. The rotation speeds of the multi-wheel classifier are as shown in Table 4. At the time of grinding, a 100-psi hot compressed air heated to 87° C. was supplied to the jet mill. Thus, the mixture was ground and simultaneously dried. The average particle diameter, D97 and water content after grinding are shown in Table 4.

The ground mixture of the disodium hydrogenphosphate (B) and the dispersing agent (C) and an EVOH (A) being the same as that used in Example 1 were melt-kneaded together so that the content of the disodium hydrogenphosphate (B) in the resin composition became 20% by weight. The melt kneading was conducted by using a twin screw extruder "TEX30" manufactured by the Japan Steel Works, Ltd. to obtain EVOH resin composition pellets. This twin screw extruder has a screw diameter of 30 mm and an L/D of 45.5.

The resulting resin compositions were heated at 600° C. for 20 minutes in a muffle furnace, and the ash contents of the resin compositions were measured.

Using the resulting EVOH resin composition pellets, monolayer films with a thickness of 2 mil (51 µm) were produced by an extruder ("Labo Plastomill 20R200" manufactured by Toyo Seiki Seisaku-Sho, Ltd.) equipped with a film attachment. The extruder was equipped with a screw with an L/D ratio of 24 and a compression ratio of 3.2 and also was equipped with a coat hanger style, 8 inch (203 mm) wide flat die. The temperature profile for the extruder barrel zones 1, 2 and 3 was 175° C., 215° C. and 225° C., respectively. The temperature of the die was set to 200° C.

The resulting films were subjected to microscope observation. Numbers of particles or agglomerates as large as 16 µm or more found in a 860 µm by 640 µm area were counted. The results are shown in Table 4.

Further, 3-kind 5-layer sheets having an overall thickness of 56 mil (1.42 mm) were obtained by using the resulting EVOH resin composition pellets, polypropylene (PP) pellets ("Marlex HNZ-020" manufactured by Chevron Phillips Chemical) and adhesive resin (Tie) pellets ("Admer QF551A" manufactured by Mitsui Chemicals, Inc.). The layer constitutions of the multilayer sheets were PP/Tie/EVOH/Tie/PP=24/2/4/2/24 mil (=0.61/0.05/0.10/0.05/0.61 mm). Thermoforming of these sheets yielded bowls with a capacity of 300 ml. The thinnest portion formed in the boundary of the bottom and the side wall was about 20 µm in thickness. Each bowl obtained was subjected to retort treatment at 121° C. for 60 minutes and also to oxygen transmission rate measurement 24 hours after the retort treatment. The oxygen transmission rate is a value measured according to ASTM F1307 and using an "Oxtran 2/21 Module H unit" manufactured by Mocon Inc. at 20° C. with internal and external relative humidities controlled to 100% and 65%, respectively.

The test conditions and test results are shown together in Table 4.

TABLE 4

| Water content of phosphoric acid salt (B) (wt %) | Dispersing agent (C) Kind | Dispersing agent (C) Compounded amount (parts by weight) | Mill rotation speed (rpm) | After grinding and mixing Average particle diameter (µm) | After grinding and mixing D97 (µm) | After grinding and mixing Moisture content (wt %) | Ash content (wt %) | The number of particles or agglomerates larger than 16 µm | OTR (cc/pkg · day · atm) |
|---|---|---|---|---|---|---|---|---|---|
| 4.94 | None | 0 | — | 15.5 | 52.1 | 4.94 | 17.7 | >500 | >13 |
| 4.94 | CaO | 5 | 4000 | 4.9 | 11.8 | 3.41 | 18.2 | 59 | 0.24 |
| 4.94 | CaSt | 2 | 4000 | 4.6 | 10.3 | 3.02 | 19.0 | 114 | 0.54 |
| 4.94 | CaSt | 5 | 4000 | 5.0 | 11.8 | 3.87 | 18.7 | 105 | 0.63 |
| 4.94 | CaSt | 10 | 4000 | 4.7 | 10.8 | 5.01 | 17.6 | 45 | 0.22 |
| 4.94 | EBSA | 5 | 4000 | 4.7 | 12.1 | 3.53 | 17.0 | 68 | 0.28 |
| 4.94 | StA | 5 | 4000 | 4.8 | 12.3 | 3.58 | 16.8 | 103 | 0.51 |
| 4.94 | GMS | 2 | 4000 | 5.1 | 11.8 | 3.92 | 17.2 | 39 | 0.51 |
| 4.94 | GMS | 5 | 4000 | 4.5 | 10.8 | 3.22 | 18.3 | 21 | 0.26 |
| 4.94 | GMS | 10 | 4000 | 4.8 | 11.5 | 3.74 | 18.1 | 10 | 0.47 |
| 3.24 | GMS | 2 | 4000 | 5.0 | 10.8 | 1.43 | 17.2 | 12 | 0.30 |
| 3.24 | GMS | 5 | 4000 | 4.5 | 10.9 | 1.79 | 18.3 | 5 | 0.27 |
| 3.24 | GMS | 10 | 4000 | 4.8 | 11.4 | 1.91 | 18.1 | 1 | 0.21 |
| 1.22 | None | 0 | 4000 | 4.7 | 12.0 | 0.55 | 17.2 | 0 | 0.21 |
| 1.22 | GMS | 2 | 4000 | 4.7 | 10.9 | 0.47 | 17.5 | 1 | 0.24 |
| 1.22 | GMS | 5 | 4000 | 4.9 | 11.5 | 0.37 | 18.1 | 0 | 0.24 |
| 1.22 | GMS | 10 | 1000 | 11.9 | 43.2 | 0.37 | 17.9 | 247 | >13 |
| 1.22 | GMS | 10 | 4000 | 5.0 | 12.0 | 0.68 | 18.4 | 2 | 0.22 |

As it is clear from Table 4, use of a phosphoric acid salt (B) with a low water content inhibit generation of agglomerates in the resin composition obtained. And, the inhibition of agglomerate generation makes it possible to obtain good gas barrier properties. Therefore, it is shown that in the preparation of the resin composition of the present invention, it is important to control the water content of the phosphoric acid salt (B) contained in the EVOH (A). In the case of a phosphoric acid salt (B) with a large particle diameter, the oxygen transmission rate after retort treatment increases with increase in the number of coarse particles in the resulting resin composition. It can be understood that among those dispersing agents, glycerol monostearate (GMS), which is a glycerol aliphatic acid ester, is excellent in the effect of inhibiting agglomerate generation.

What is claimed is:

1. A resin composition comprising
an ethylene-vinyl alcohol copolymer (A) having an ethylene content of from 15 to 65 mol % and a degree of saponification of 95 mol % or more,
a phosphoric acid salt (B) which can form a hydrate, and
a dispersing agent (C),
wherein the phosphoric acid salt (B) comprises a powder containing 97% by volume or more of particles having a particle diameter of 16 µm or less, and having an average particle diameter of 10 µm or less,
wherein the dispersing agent (C) comprises an aliphatic acid salt having from 8 to 40 carbon atoms,
wherein the resin composition comprises (A) and (B) in amounts of from 50 to 99 parts by weight and from 1 to 50 parts by weight, respectively, based on 100 parts by weight of (A) and (B) in total, and
wherein the resin composition comprises (C) in an amount of from 1 to 20 parts by weight based on 100 parts by weight of (B).

2. The resin composition according to claim 1, wherein the resin composition comprises the dispersing agent (C) in an amount of from 3 to 10 parts by weight based on 100 parts by weight of the phosphoric acid salt (B).

3. A multilayer structure comprising a layer of the resin composition according to claim 1, and layers of at least one thermoplastic resin selected from the group consisting of polyolefin, polystyrene, polyester, polyamide, polyvinyl chloride, polyvinylidene chloride, polyvinyl acetate and polyacrylonitrile, arranged on both sides of the layer of the resin composition.

4. The multilayer structure according to claim 3, wherein the layers of a thermoplastic resin selected from the group consisting of polyolefins, polystyrenes, polyesters, polyamides, polyvinyl chlorides, polyvinylidene chlorides, polyvinyl acetates and polyacrylonitriles are arranged on both sides of the layer of the resin composition via an adhesive resin layer.

5. A packaging container comprising the multilayer structure according to claim 3.

6. A retort package comprising the packaging container according to claim 5 filled with contents.

7. A method for producing the resin composition according to claim 1 comprising melt-kneading the ethylene-vinyl alcohol copolymer (A), the phosphoric acid salt (B) and the dispersing agent (C).

8. The method for producing the resin composition according to claim 7, wherein the phosphoric acid salt (B) and the dispersing agent (C) are mixed before being melt kneaded with the ethylene-vinyl alcohol copolymer (A).

9. The method for producing the resin composition according to claim 7, wherein the phosphoric acid salt (B) is ground before the melt-kneading.

10. The method for producing the resin composition according to claim 9, wherein the phosphoric acid salt (B) is ground in the presence of the dispersing agent (C).

11. The method for producing the resin composition according to claim 9, wherein the phosphoric acid salt (B) is ground before the dispersing agent (C) is mixed.

12. The method for producing the resin composition according to claim 7, wherein the phosphoric acid salt (B) is dried before the melt-kneading.

13. The method for producing the resin composition according to claim 12, wherein the phosphoric acid salt (B) is ground and simultaneously dried.

14. The method for producing the resin composition according to claim 12, wherein the phosphoric acid salt (B) is dried so that the phosphoric acid salt (B) comes to have a water content of 2% by weight or less.

15. The method for producing the resin composition according to claim 7, wherein the temperature during the melt-kneading is from 190 to 260° C.

16. The resin composition of claim 1, wherein the dispersing agent (C) is selected from the group consisting of calcium stearate, zinc stearate, magnesium stearate, and combinations thereof.

17. The resin composition of claim 1, wherein the dispersing agent (C) comprises calcium stearate.

18. The resin composition of claim 1, wherein the dispersing agent (C) comprises zinc stearate.

19. The resin composition of claim 1, wherein the dispersing agent (C) comprises magnesium stearate.

* * * * *